(12) United States Patent
Uda

(10) Patent No.: US 9,322,410 B2
(45) Date of Patent: Apr. 26, 2016

(54) ELECTRIC PUMP DEVICE

(75) Inventor: Kengo Uda, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 198 days.

(21) Appl. No.: 13/981,435

(22) PCT Filed: Jan. 25, 2012

(86) PCT No.: PCT/JP2012/051485
§ 371 (c)(1),
(2), (4) Date: Jul. 24, 2013

(87) PCT Pub. No.: WO2012/102282
PCT Pub. Date: Aug. 2, 2012

(65) Prior Publication Data
US 2013/0309101 A1 Nov. 21, 2013

(30) Foreign Application Priority Data
Jan. 25, 2011 (JP) .................................. 2011-013258

(51) Int. Cl.
*F04D 27/00* (2006.01)
*G05B 5/01* (2006.01)
*H02P 6/08* (2016.01)
*F16H 61/00* (2006.01)

(52) U.S. Cl.
CPC ............ *F04D 27/00* (2013.01); *F16H 61/0031* (2013.01); *G05B 5/01* (2013.01); *H02P 6/085* (2013.01); *F16H 2061/0078* (2013.01)

(58) Field of Classification Search
CPC .... F04B 49/065; F04B 2205/05; F04B 17/03; F04B 49/06; F04B 49/08; F04D 27/00; F16H 61/0031; F16H 2061/0078; H02P 6/085; G05B 5/01; G05B 11/42
USPC .................................. 417/44.2; 318/610, 611
See application file for complete search history.

(56) References Cited

U.S. PATENT DOCUMENTS 5,836,347 A 11/1998 Harries
2003/0171187 A1 9/2003 Aoki et al.
(Continued)

FOREIGN PATENT DOCUMENTS

CN 1134133 A 10/1996
JP 05168270 A * 7/1993
(Continued)

OTHER PUBLICATIONS

International Search Report issued in International Application No. PCT/JP2012/051485 dated Feb. 21, 2012 (with translation).
(Continued)

*Primary Examiner* — Bryan Lettman
*Assistant Examiner* — Philip Stimpert
(74) *Attorney, Agent, or Firm* — Oliff PLC

(57) ABSTRACT

An electric pump device of an aspect of the invention includes a state determination unit and a gain adjusting unit. The state determination unit determines whether or not the electric pump device is in a stable state where a required oil pressure is supplied to a hydraulic operating device by maintaining a rotation state of a motor. The gain adjusting unit adjusts a gain for a current feedback control so as to reduce responsiveness of the current feedback control when the state determination unit determines that the electric pump device is in the stable state.

6 Claims, 4 Drawing Sheets

(56) References Cited

U.S. PATENT DOCUMENTS

| | | | |
|---|---|---|---|
| 2008/0111633 A1* | 5/2008 | Cranford | H03L 7/0898 331/10 |
| 2009/0087319 A1* | 4/2009 | Russold et al. | 417/45 |

FOREIGN PATENT DOCUMENTS

| | | |
|---|---|---|
| JP | A-05-168270 | 7/1993 |
| JP | A-05-240331 | 9/1993 |
| JP | A-10-103476 | 4/1998 |
| JP | A-2001-103782 | 4/2001 |
| JP | 2006-161850 A | 6/2006 |
| JP | A-2006-280088 | 10/2006 |
| JP | A-2008-148475 | 6/2008 |
| JP | A-2010-259132 | 11/2010 |

OTHER PUBLICATIONS

Office Action issued in Japanese Patent Application No. 2011-013258 dated Sep. 9, 2014 (with translation).

Apr. 17, 2015 Office Action issued in Chinese Patent Application No. 201280006517.0.

Jan. 8, 2016 Search Report issued in European Patent Application No. 12739050.8.

* cited by examiner

ELECTRIC PUMP DEVICE

TECHNICAL FIELD

The present invention relates to an electric pump device.

BACKGROUND ART

An electric pump device in the related art generates oil pressure by driving an oil pump using a motor (see Patent Document 1, for example). The electric pump device is mounted, for example, in a vehicle having an idle reduction function which automatically stops an engine during the temporary stop of the vehicle. The electric pump device is configured to supply oil pressure to a hydraulic operating device such as a transmission mechanism during no idle by the idle reduction function in which the oil pump driven by the engine stops.

Generally, in a control device provided in this kind of electric pump device, current feedback control is executed so as to cause an actual current value to follow a current command value corresponding to a target oil pressure, and based on this, driving power is supplied to the motor. Also, the oil pressure generated in the oil pump is controlled by supplying the driving power to the motor.

RELATED ART DOCUMENTS

Patent Documents

[Patent Document 1] JP-A-2006-280088

SUMMARY OF THE INVENTION

Problem to be Solved by the Invention

Moreover, during the period from the start of the electric pump device until the oil pressure generated in the oil pump reaches the target oil pressure, it is preferable to quickly increase a rotation speed (motor angular velocity) of the motor in order to promptly generate the required oil pressure. Therefore, it is considerable to set a gain so as to enhance responsiveness of the current feedback control.

Meanwhile, a vehicle stops at the time of operating the electric pump device which supplies the oil pressure as described above during the no idle, for example. Therefore, external disturbances thereon are minimal, and also, the target oil pressure is hardly changed. Thus, after reaching the target oil pressure, the electric pump device is in a state (stable state) where the required oil pressure is supplied to a hydraulic operating device by maintaining the rotation of the motor. In such a stable state, the high responsiveness of the current feedback control is not required. Further, if the responsiveness is high, there is a possibility that the rotation of the motor may be unstable, rather than being stable, due to hypersensitive reaction with respect to noise or the like.

As described above, when the responsiveness of the current feedback control is set to be high in order to promptly generate the oil pressure required at the time of starting, it is likely to cause, as an adverse effect, the rotation of the motor to be unstable in the stable state, and further, the oil pressure supplied from the oil pump may be fluctuates. Thereby, there is a possibility that noise or vibration may occur. In addition, this kind of problem can occur not only in the electric pump device which supplies oil pressure during the no idle but also in the electric pump device for other purposes, in a similar way.

The present invention has been made in view of the above-described circumstances, and an object thereof is to provide an electric pump device which is able to quickly generate the required oil pressure when starting and to stably supply the oil pressure.

Means for Solving the Problem

According to a first aspect of the present invention, there is provided an electric pump device including: an oil pump which generates oil pressure; a motor which drives the oil pump; and a control device which controls operation of the oil pump by supplying driving power to the motor, wherein the control device includes: a control signal output unit which outputs a motor control signal; and a driving circuit which outputs the driving power based on the motor control signal, wherein the control signal output unit generates the motor control signal by executing a current feedback control so as to cause an actual current value supplied to the motor to follow a current command value corresponding to a target oil pressure, and wherein the electric pump device further includes: a state determination unit which determines whether or not the electric pump device is in a stable state where the required oil pressure is supplied to a hydraulic operating device by maintaining a rotation state of the motor; and a gain adjusting unit which adjusts a gain for the current feedback control so as to reduce responsiveness of the current feedback control when the state determination unit determines that the electric pump device is in the stable state.

According to the configuration described above, if it is determined that the electric pump device is in the stable state, the gain is adjusted so as to reduce the responsiveness of the current feedback control. Therefore, the responsiveness of the current feedback control is set to be high in a non-stable state (starting state from the start until the oil pressure reaches the target oil pressure, for example), whereby it is possible to prevent the rotation of the motor from being unstable in the stable state. Consequently, it is possible to quickly generate the required oil pressure when starting and to stably supply the oil pressure to the hydraulic operating device. As a result, it is possible to prevent noise or vibration from occurring.

According to a second aspect of the present invention, in the electric pump device according to the first aspect described above, the state determination unit determines whether or not the electric pump device is in the stable state based on a parameter indicating a rotation state of the motor.

In other words, since the control device executes the current feedback control, the parameter indicating the rotation state of the motor is hardly changed in the stable state where the required oil pressure is supplied to the hydraulic operating device by maintaining the rotation state of the motor. Therefore, by using the parameter indicating the rotation state of the motor as in the configuration described above, it is possible to easily determine whether or not the electric pump device is in the stable state, for example, by determining a change in a quantity of the parameter.

Advantages of the Invention

According to the present invention, it is possible to provide an electric pump device which is able to quickly generate the required oil pressure when starting and to stably supply the oil pressure.

MODE FOR CARRYING OUT THE INVENTION

Hereinafter, an embodiment which embodies the present invention will be described with reference to drawings.

Figure 1:
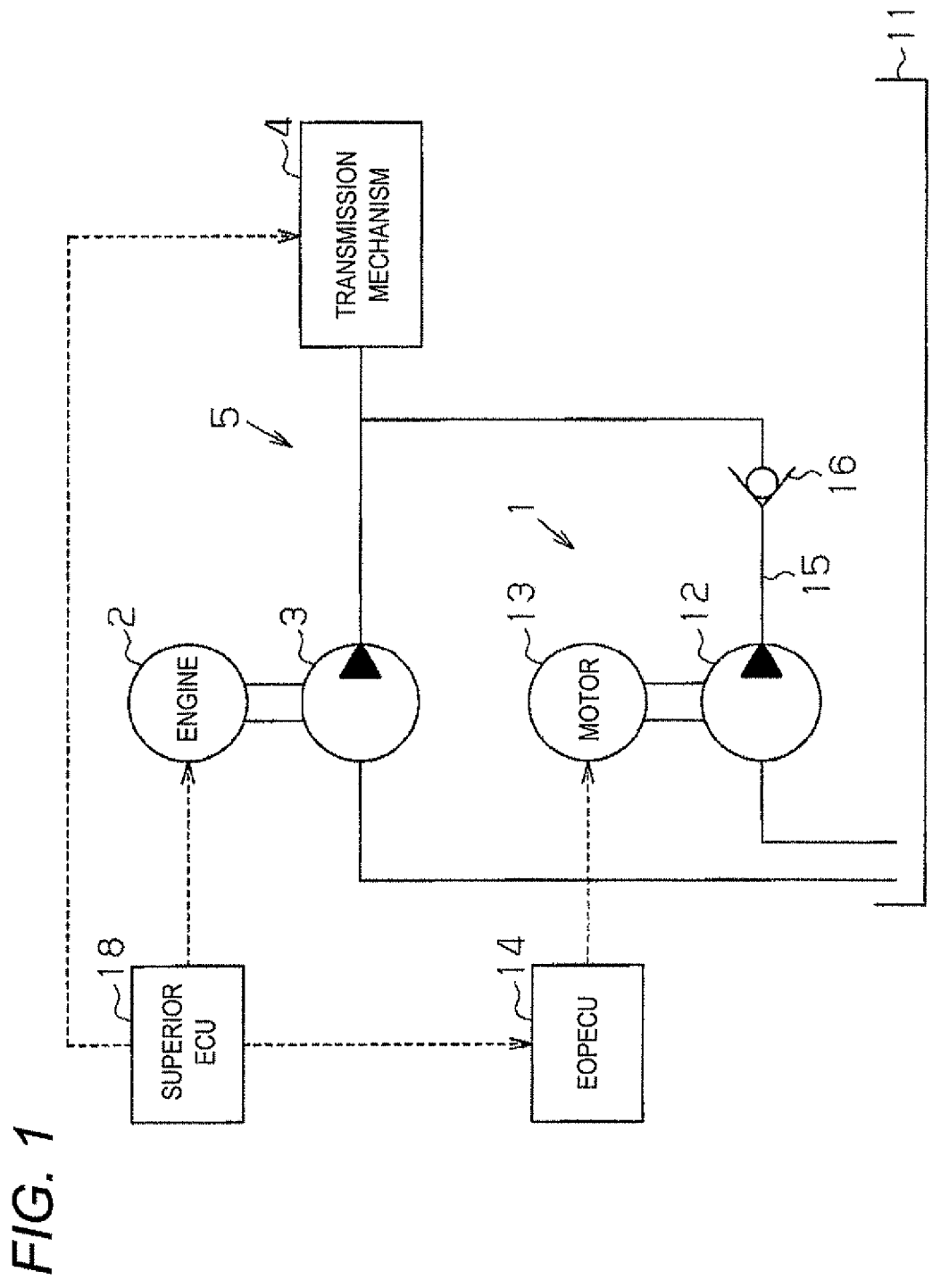
FIG. 1 is a schematic configuration diagram showing a hydraulic circuit to supply oil pressure to a transmission mechanism.

An electronic pump device 1 shown in FIG. 1 is mounted in a vehicle (not shown) having an idle reduction function which automatically stops an engine 2 during the temporary stop of the vehicle. The electronic pump device 1 and a main pump 3 driven by the engine 2 are provided in a hydraulic circuit 5 to supply oil pressure (hydraulic operating oil) to a transmission mechanism 4 (which is a continuously variable transmission in this embodiment) as a hydraulic operating device. As a substitution for the main pump 3 at the time of stopping the engine 2, the electronic pump device 1 supplies oil pressure to the transmission mechanism 4 during the no idle or the like.

Specifically, the main pump 3 is drive-connected to the engine 2. Also, the main pump 3 driven by the engine 2 sucks hydraulic operating oil from an oil pan 11 and supplies the oil pressure to the transmission mechanism 4. Meanwhile, the electronic pump device 1 includes an oil pump 12 which generates oil pressure, a motor 13 which drives the oil pump 12 and an EOPECU (EOP: Electric Oil Pump, ECU: Electronic Control Unit) 14 serving as a control device which controls the operation of the oil pump 12 by supplying driving power to the motor 13. In addition, in the electronic pump device 1, the oil pump 12 is driven by the motor 13, whereby the electronic pump device 1 sucks the hydraulic operating oil from the oil pan 11 and supplies oil pressure to the transmission mechanism 4. Also, a check valve 16 to prevent the reverse flow of the hydraulic operating oil when stopping is provided in an outlet oil path 15 of the oil pump 12.

A superior ECU 18 to control the operations of the engine 2 and the transmission mechanism 4 is provided in the vehicle. The superior ECU 18 is configured so that various kinds of sensor values such as a vehicle speed or an accelerator position are input thereto. Also, the superior ECU 18 controls the operations of the engine 2 and the transmission mechanism 4 based on the input parameters indicating the state. For example, if the superior ECU 18 determines that a specific stop condition is satisfied based on the vehicle speed, the accelerator position or the like, the superior ECU 18 causes the engine 2 to stop. Also, if the superior ECU 18 determines that a specific restart condition is satisfied, the superior ECU 18 executes the idle reduction control to restart the engine 2.

Furthermore, EOPECU 14 is connected to the superior ECU 18 and configured so as to cause the oil pump 12 to supply oil pressure to the transmission mechanism 4 by driving the motor 13 during the no idle, based on a control signal (which includes a current command value I* described below) from the superior ECU 18.

Next, an electrical configuration of the electronic pump device will be described.

Figure 2:
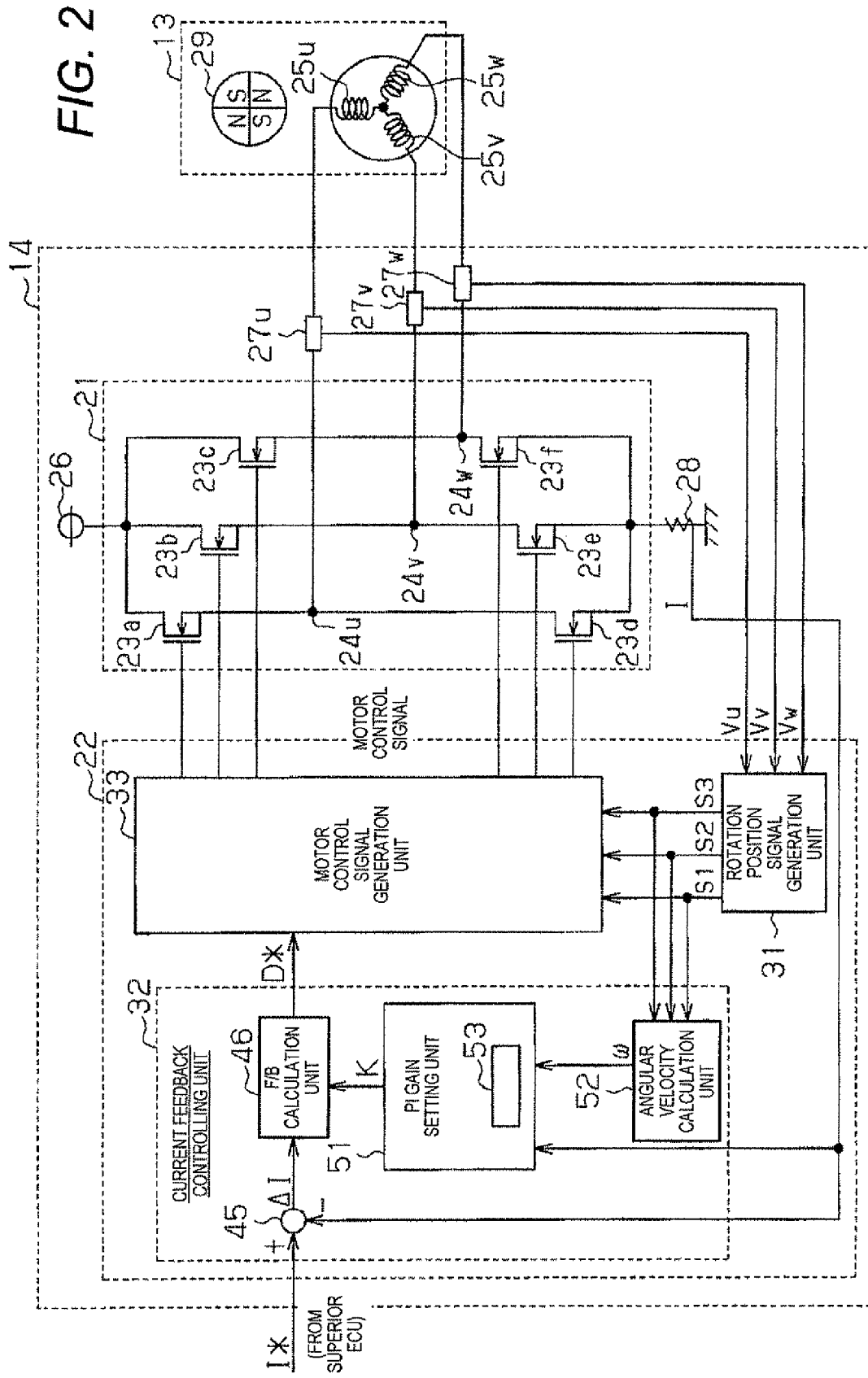
FIG. 2 is a block diagram showing an electrical configuration of an electric pump device.

As shown in FIG. 2, the EOPECU 14 includes a driving circuit 21 which supplies three-phase (U, V, W) driving power to the motor 13 and a microcomputer 22 as a control signal output which drives the motor 13 by outputting a motor control signal to the driving circuit 21. In addition, in the embodiment, a sensorless-type brushless motor is adopted as the motor 13 and the EOPECU 14 supplies the driving power to the motor 13 in the manner of 120 degrees rectangular wave conduction in which a conducting phase and a conducting direction are changed at each angle (electrical angle) of 120 degrees.

The driving circuit 21 is configured of connecting a plurality of FETs 23a to 23f, which are switching elements, to each other. Specifically, the driving circuit 21 is composed of connecting serial circuits of groups of FETs 23a and 23d, FETs 23b and 23e and FETs 23c and 23f to each other in parallel. Also, connecting points 24u, 24v and 24w between the FETs 23a and 23d, FETs 23b and 23e and FETs 23c and 23f are respectively connected to motor coils 25u, 25v and 25w of each phase in the motor 13.

In other words, a known PWM inverter is adopted in the driving circuit 21. In this case, a pair of switching elements connected in series is set as a basic unit (switching arm) in the known PWM inverter, and the PWM inverter is composed of connecting three switching arms, corresponding to each phase, to each other in parallel. Furthermore, the motor control signal output from the microcomputer 22 is a gate on/off signal to regulate the switching state of each of the FETs 23a to 23f which constitute the driving circuit 21. In addition, each of the FETs 23a to 23f is turned on or off in response to the motor control signal applied to a gate terminal thereof, and therefore, the conducting phase and the conducting direction (conduction pattern) to the motor coils 25u, 25v and 25w of each phase are changed. Thereby, DC voltage of an in-vehicle electric source (battery) 26 is converted into the three-phase driving power and output to the motor 13.

Apart from the superior ECU 18, voltage sensors 27u, 27v and 27w to detect terminal voltages Vu, Vv and Vw of the motor coils 25u, 25v and 25w and a current sensor 28 to detect an actual current value I conducted to the motor 13 are connected to EOPECU 14.

The microcomputer 22 estimates a rotation position of a rotor 29 based on each of the terminal voltages Vu, Vv and Vw and determines the conduction pattern. Furthermore, the microcomputer 22 executes a current feedback control so as to cause an actual current value I to follow the current command value I* corresponding to a target oil pressure which is output from the superior ECU 18, whereby determining a duty ratio as the rate of an ON time of each of the FETs 23a to 23f. Also, the superior ECU 18 calculates the current command value I* based on the oil pressure generated in the electronic pump device 1 (oil pump 12), a rotation speed of the engine or the like. Furthermore, the microcomputer 22 outputs the motor control signal having the determined conduction pattern and the duty ratio so as to cause the three-phase driving power to be supplied to the motor 13, whereby controlling the oil pressure generated in the oil pump 12 by supplying the driving power.

More specifically, the microcomputer 22 includes a rotation position signal generation unit 31 which generates rotation position signals S1 to S3 which indicates the rotation position of the rotor 29 based on each of the terminal voltages Vu, Vv and Vw and a current feedback controlling unit 32 which generates a duty command value D* which indicate the duty ratio based on the current command value I* and the actual current value I. In addition, the microcomputer 22 includes a motor control signal generation unit 33 which generates the motor control signal based on the rotation position signals S1 to S3 and the duty command value D*.

Figure 3:
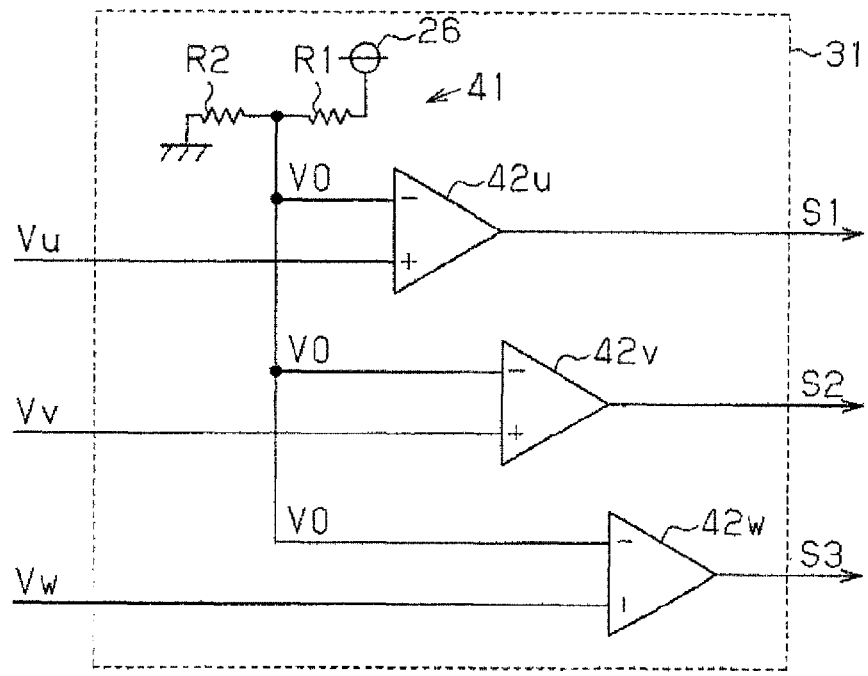
FIG. 3 is a block diagram showing an electrical configuration of a rotation position signal generation unit.

As shown in FIG. 3, the rotation position signal generation unit 31 includes a voltage divider 41 configured of connecting two resistors R1 and R2, which have the same resistance value, to each other in series, and three comparators 42u, 42v and 42w to compare a reference voltage V0 (which is a half voltage of the in-vehicle electric source 26, in the embodiment) output from the voltage divider 41 with the terminal voltages Vu, Vv and Vw respectively. Each of the comparators 42u, 42v and 42w outputs the rotation position signals S1 to S3 to the motor control signal generation unit 33 based on the comparison between the terminal voltages Vu, Vv and Vw and the reference voltage V0. Specifically, when the terminal voltages Vu, Vv and Vw are greater than the reference voltage V0, each of the comparators 42u, 42v and 42w outputs "1 (high level)" as the rotation position signals S1 to S3. On the other hand, when the terminal voltages Vu, Vv and Vw are equal to or less than the reference voltage V0, each of the comparators 42u, 42v and 42w outputs "0 (low level)" as the rotation position signals S1 to S3.

Figure 4:
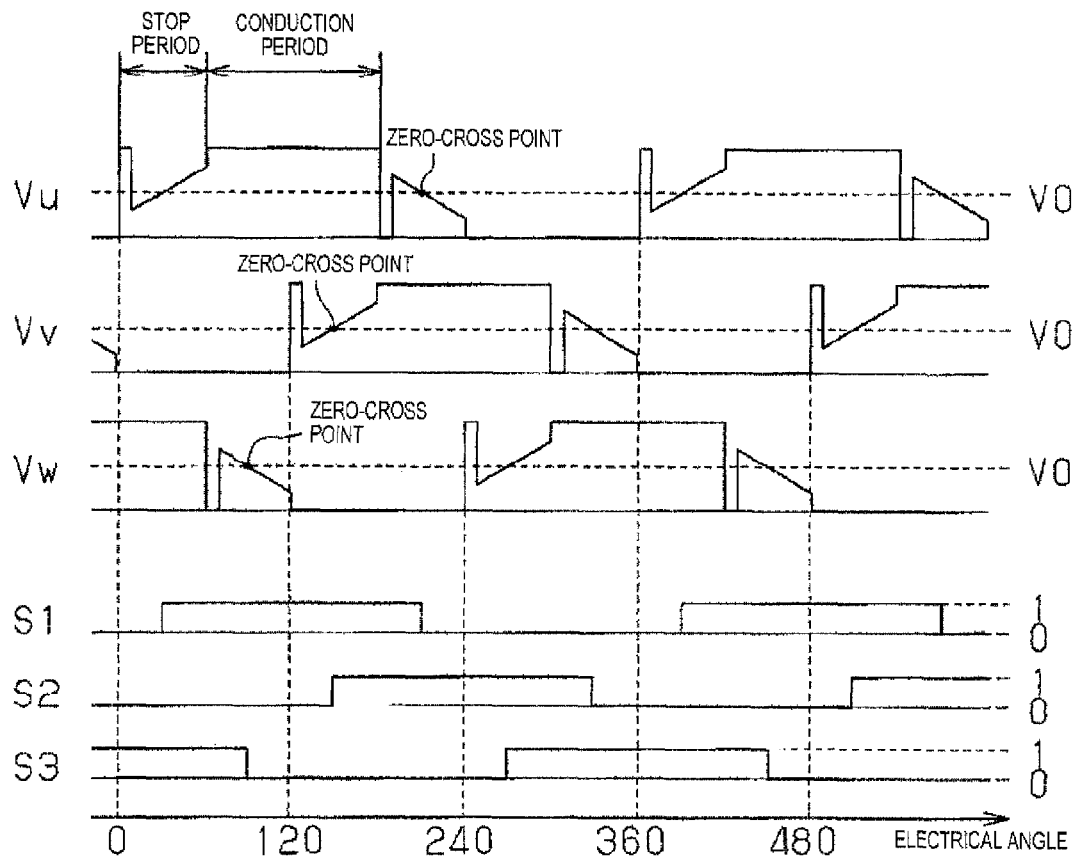
FIG. 4 is a waveform chart of a terminal voltage of a motor coil and a rotation position signal.

In this case, as shown in FIG. 4, the terminal voltages Vu, Vv and Vw are different by 120 degrees in phase, and a power supply voltage is detected at the energized conduction period of 120 degrees in the range of electrical angle 180 degrees. Also, an inductive voltage (counter-electromotive force) generated in each of motor coils 25u, 25v and 25w is detected at the non-energized stop period of 60 degrees. In addition, when each of the FETs 23a to 23f is switched from the ON state to the OFF state, a parasitic diode (not shown) of the FETs 23a to 23f causes noise to occur. Furthermore, the rotation position signals S1 to S3 are changed at the point (zero-cross point) of time where the terminal voltages Vu, Vv and Vw become the reference voltage V0, and therefore, the noise is eliminated. Namely, the rotation position signals S1 to S3 are regularly changed in order of (101)→(100)→(110)→(010)→(011)→(001), corresponding to the rotation position of the rotor 29.

As shown in FIG. 2, the current feedback controlling unit 32 includes a subtracter 45 which calculates a current deviation ΔI based on the current command value I* and the actual current value I which are input thereto and a feedback calculating unit (FIB calculating unit) 46 which calculates the duty command value D* based on the current deviation ΔI. The feedback calculating unit 46 calculates the duty command value D* by multiplying the input current deviation ΔI by a predetermined gain (PI gain) K. Also, the bigger the value of the duty command value D* is, the higher the duty ratio is. In addition, the current feedback controlling unit 32 outputs the duty command value D*, which is calculated in this way, to the motor control signal generation unit 33.

The motor control signal generation unit 33 generates the motor control signal. The motor control signal has the conduction pattern which is corresponding to the rotation position signals S1 to S3 input from the rotation position signal generation unit 31 and the duty ratio which is indicated in the duty command value D* input from the current feedback controlling unit 32. Furthermore, the motor control signal generation unit 33 measures the time interval between the zero-cross points, namely the time interval where the rotor 29 rotates at electrical angle 60 degrees, and the signal pattern indicated by the rotation position signals S1 to S3 is changed. Then, the motor control signal generation unit 33 outputs the generated motor control signal to each of the FETs 23a to 23f of the driving circuit 21 such that the conduction pattern is switched at the point of time where a predetermined switching time corresponding to the time interval described above has passed from the latest zero-cross point. Thereby, the three-phase driving power is supplied to the motor 13. Furthermore, in the embodiment, the predetermined switching time is a half of the time interval between the adjacent zero-cross points.

(Gain Adjustment Process)

Next, a gain adjustment process in which a gain for the current feedback control by the microcomputer of the embodiment is adjusted in response to the operation state of the electronic pump device will be described.

As described above, in order to promptly supply the required oil pressure to the transmission mechanism 4 when starting, it is considerable to set the gain K to be high so as to enhance the responsiveness of the current feedback control. However, the electronic pump device 1 supplies oil pressure during the no idle where the vehicle stops. Therefore, external disturbances are small and the target oil pressure is hardly changed, as well. Thus, after reaching the target oil pressure, the electronic pump device 1 is in the stable state where the required oil pressure is supplied by maintaining the rotation state of the motor 13. If the responsiveness of the current feedback control is high in the stable state, there is a possibility that the rotation of the motor 13 may be unstable.

In the consideration of the point described above, the EOPECU 14 determines whether or not the electronic pump device 1 is in the stable state, where the required oil pressure is supplied to the transmission mechanism 4 by maintaining the rotation state of the motor 13, after passing through the starting state from the start of the motor 13 until the oil pressure generated in the oil pump 12 reaches the target oil pressure. Then, when the electronic pump device 1 is in the stable state, the gain K of the current feedback control is reduced to be lower than the gain K in the starting state.

Specifically, a PI gain setting unit 51 to adjust the gain K and an angular velocity calculation unit 52 to calculate a motor angular velocity (angular velocity of the rotor) ω based on the rotation position signals S1 to S3 are provided in the current feedback controlling unit 32 of the microcomputer 22. The actual current value I detected by the current sensor 28 described above and the motor angular velocity ω calculated by the angular velocity calculation unit 52 are input to the PI gain setting unit 51. When the motor 13 starts, the PI gain setting unit 51 sets the gain K to a high response gain K1 where the responsiveness of the feedback control is high. Also, the PI gain setting unit 51 determines whether or not the electronic pump device 1 is in the stable state based on the motor angular velocity ω indicating the rotation state of the motor 13 and the actual current value I. Then, when the electronic pump device 1 is in the stable state, the PI gain setting unit 51 changes the gain K to a low response gain K2 smaller than the high response gain K1. In other words, the PI gain setting unit 51 functions as a state determination unit and a gain adjusting unit in the embodiment.

In more detail, the PI gain setting unit 51 detects the motor angular velocity ω and the actual current value I in a predetermined sampling period, and the actual current value I and the motor angular velocity ω of one cycle before the latest actual current value I and the motor angular velocity ω are stored in a memory 53 provided in the PI gain setting unit 51. In addition, the PI gain setting unit 51 calculates amounts of change (hereinafter referred to as "change amounts") X and Y from the previous values (actual current value I and motor angular velocity ω of one cycle before the latest ones) of the actual current value I and the motor angular velocity ω, and determines whether or not the change amounts X and Y are respectively equal to or less than a predetermined rates of the previous values Xth and Yth as a threshold. Furthermore, in the embodiment, the predetermined rates Xth and Yth are set to a value of about 10% of the previous values. In addition, when the change amounts X and Y are continuously equal to or less than the predetermined rates Xth and Yth of the previous values during a predetermined determining period, the PI gain setting unit 51 determined that the electronic pump device 1 is in the stable state. Therefore, the PI gain setting unit 51 changes the gain K from the high response gain K1 to the low response gain K2. In addition, the angular velocity calculation unit 52 calculates the motor angular velocity ω based on the time interval between the zero-cross points.

Figure 5:
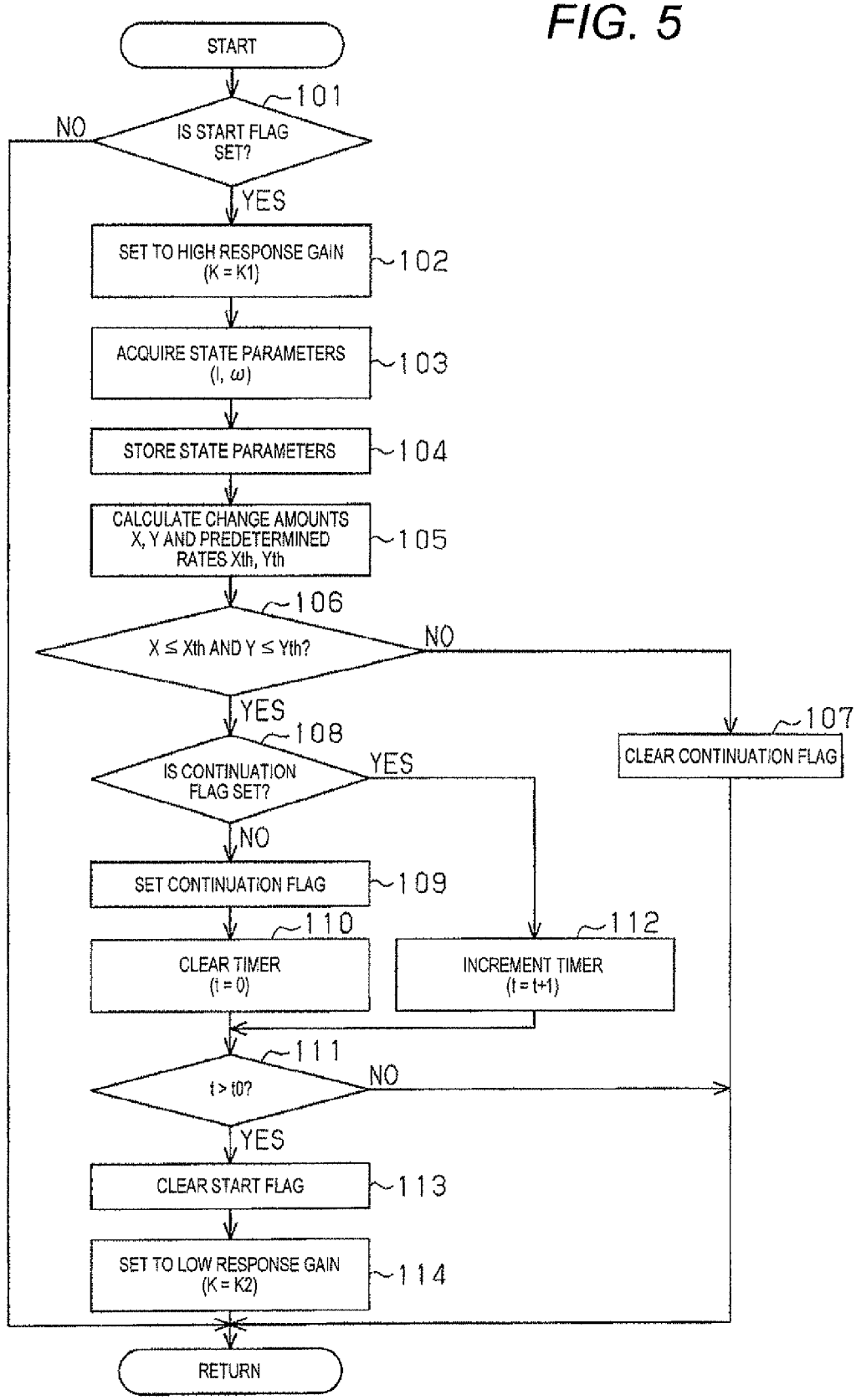
FIG. 5 is a flowchart showing a procedure of a gain adjustment process.

Next, an adjustment procedure of the gain of the current feedback control by the microcomputer (PI gain setting unit) of the embodiment will be described with reference to the flowchart shown in FIG. 5.

When the control signal causing the oil pump 12 to generate oil pressure is input from the superior ECU 18, the microcomputer 22 determines whether or not a start flag indicating the starting state of the electronic pump device 1 is set (step 101). When the start flag is set (step 101: YES), the microcomputer 22 sets the value of the gain K to the high response gain K1 (step 102). Incidentally, the start flag is set in an initial state. Subsequently, the microcomputer 22 acquires the actual current value I and the motor angular velocity ω (step 103) and stores the actual current value I and the motor angular velocity ω in the memory 53 (step 104). Then, the microcomputer 22 reads out the previous values of the actual current value I and the motor angular velocity ω from the memory 53 and calculates the change amounts X and Y and the predetermined rates Xth and Yth (step 105). Next, the microcomputer 22 determines whether or not the change amounts X and Y are respectively equal to or less than the predetermined rates Xth and Yth (step 106).

When the change amount X is greater than the predetermined rate Xth or the change amount Y is greater than the predetermined rate Yth (step 106: NO), the microcomputer 22 continuously clears a continuation flag which indicates the change amounts X and Y are respectively equal to or less than the predetermined rates Xth and Yth (step 107). On the other hand, When the change amounts X and Y are respectively equal to or less than the predetermined rates Xth and Yth (step 106: YES), the microcomputer 22 determines whether or not the continuation flag is set (step 108). When the continuation flag is not set (step 108: NO), the microcomputer 22 sets the continuation flag (step 109). Also, the microcomputer 22 clears a timer indicating the time where the change amounts X and Y are respectively equal to or less than the predetermined rates Xth and Yth (step 110: t=0) and determines whether or not a timer t is greater than a predetermined timer value t0 (step 111). On the other hand, when the continuation flag is set (step 108: YES), the microcomputer 22 increases the timer t (step 112: t=t+1) and proceeds to the step 111.

In addition, when the timer t is greater than the predetermined timer value t0 (step 111: YES), the microcomputer 22 determines that the electronic pump device 1 is in the stable state and clears the start flag (step 113). Then, the microcomputer 22 sets the value of the gain K to the low response gain K2 (step 114). Furthermore, when the timer t is equal to or less than the predetermined timer value t0 (step 111: NO), the microcomputer 22 does not execute the processes of step 113 and step 114. Still further, when the start flag is not set (step 101: NO), the microcomputer 22 does not execute the processes of steps 102 to 114.

According to the embodiment, it is possible to achieve the following action effects, as described above.

(1) The microcomputer 22 includes the PI gain setting unit 51. The PI gain setting unit 51 determines whether or not the electronic pump device 1 is in the stable state where the required oil pressure is supplied to the transmission mechanism 4 by maintaining the rotation state of the motor 13. When the electronic pump device 1 is in the stable state, the PI gain setting unit 51 changes the gain K of the current feedback control to the low response gain K2 smaller than the high response gain K1 which is set in the starting state.

According to the configuration described above, if it is determined that the electronic pump device 1 is in the stable state, the gain K is changed to the low response gain K2. Therefore, the gain K can be set to the high response gain K1 in the starting state, and also, it is possible to prevent the rotation of the motor 13 from being unstable in the stable state. Thereby, it is possible to quickly generate the required oil pressure when starting and to stably supply the oil pressure to the transmission mechanism 4. As a result, it is possible to prevent noise or vibration from occurring. Particularly, the electronic pump device 1 according to the embodiment supplies oil pressure during the no idle where the vehicle stops, and the start and stop thereof are repeated. In other words, since the operation state of the electronic pump device 1 (motor 13) is frequently changed, there is a large effect to improve the responsiveness thereof in the starting state and to stabilize the rotation of the motor 13 in the stable state by adjusting the gain K as described above.

(2) When the change amounts X and Y of the actual current value I and the motor angular velocity ω are continuously equal to or less than the predetermined rates Xth and Yth during the predetermined determining period, the PI gain setting unit 51 is configured so as to determine that the electronic pump device 1 is in the stable state.

In other words, since the microcomputer 22 executes the current feedback control, the actual current value I and the motor angular velocity ω are hardly changed in the stable state. Therefore, it is possible to easily and precisely determine whether or not the electronic pump device 1 is in the stable state by using the actual current value I and the motor angular velocity ω, as the configuration described above.

(3) A sensorless-type brushless motor is adopted as the motor 13. Also, the EOPECU 14 is configures so as to estimate the rotation position of the rotor 29 based on the inductive voltage generated in the motor coils 25*u*, 25*v* and 25*w* and supply the three-phase driving power to the motor 13. According to the configuration described above, since a rotation sensor such as a hall element of which performance greatly varies depending on temperature is not employed, it is possible to precisely control the operation of the motor 13 even when the electronic pump device 1 is under the high-temperature environment such as an engine room.

In this case, in the embodiment, the conduction pattern is switched at the point of time where a predetermined switching time corresponding to the time interval between the latest zero-cross points has elapsed from the zero-cross point detected lately. Thereby, the responsiveness thereof is high. Therefore, if the motor angular velocity ω changes abruptly, there is a possibility that the switching timing of the conduction pattern may deviate from the appropriate timing corresponding to the actual rotation position of the rotor 29. Thereby, it is likely that maladjustment occurs. Thus, in the configuration where a sensorless-type brushless motor is adopted as a driving source of the oil pump 12 as in the embodiment, there is a large effect to stabilize the rotation of the motor 13 in the stable state by changing the gain K to the low response gain K2 in the stable state.

Furthermore, the aspects of the embodiment described above can be appropriately changed as follows.

(i) In the embodiment described above, it is determined whether or not the electronic pump device 1 is in the stable state by using the actual current value I and the motor angular velocity ω. However, the present invention is not limited thereto, and it may be determined whether or not the electronic pump device 1 is in the stable state by only using any one of the actual current value I and the motor angular velocity ω, for example. In addition, another parameter such as an angular acceleration of the motor 13 may be adopted as the parameter indicating the rotation state of the motor 13, aside from the actual current value I and the motor angular velocity ω.

(ii) The embodiment described above may be configured as follows. First, whether or not the maladjustment of the rotor 29 occurs is determined after the determination of the stable state. Then, if the maladjustment thereof is determined, the start flag is cleared and the high response gain K1 is reset as the value of the gain K.

(iii) In the embodiment described above, it is determined whether or not the electronic pump device 1 is in the stable state based on the parameter indicating the rotation state of the motor 13. However, the present invention is not limited thereto, and it may be determined whether or not the electronic pump device 1 is in the stable state based on the oil pressure generated in the oil pump 12 detected by an oil sensor, for example. When the change amount of the detected oil pressure is continuously equal to or less than the threshold during a predetermined determining period, it can be determined that the electronic pump device 1 is in the stable state, for example.

(iv) In the embodiment described above, a sensorless-type brushless motor is adopted as the motor 13. However, the present invention is not limited thereto, and a brushless motor or a brush DC motor which has a rotation sensor such as a hall element to detect the rotation position of the rotor 29 may be adopted, for example.

(v) In the embodiment described above, the present invention is embodied in an electronic pump device which is mounted in a vehicle having an idle reduction function and supplies oil pressure to a transmission mechanism. However, the present invention is not limited thereto, and the present invention may be embodied in an electronic pump device for an electronic hydraulic power steering (EHPS) device or an electronic pump for other purposes.

Next, technical ideas obtained from the embodiments described above and the other examples will be described below along with the effects thereof.

(A) In the electronic pump device according to the second aspect, when the change amounts of the actual current value and the motor angular velocity are continuously equal to or less than the threshold during the predetermined determining period, the state determination unit determines that the electronic pump device is in the stable state. According to this configuration, it is possible to precisely determine whether or not the electronic pump device is in the stable state.

(B) In the electronic pump device according to any one of the first aspect, the second aspect and the aspect described in (A), a sensorless-type brushless motor is adopted as the motor. Also, the control device is configured so as to estimate the rotation position of the rotor based on the inductive voltage generated in the motor coils and supply the driving power to the motor. According to this configuration, since the rotation sensor such as a hall element of which performance greatly varies depending on temperature is not employed, it is possible to precisely control the operation of the motor even when the electronic pump device is under the high-temperature environment such as an engine room.

In the configuration described above, the rotation position of the rotor is estimated by detecting the time point (zero-cross point) where the inductive voltage of each motor coil is a reference potential. Then, the conducting phase and the conducting direction are switched at the point of time where the predetermined switching time has elapsed, which corresponds to the time interval (motor angular velocity) between the previous zero-cross points, from the detected zero-cross point, and the three-phase driving power is supplied. Thereby, the responsiveness thereof is high. Therefore, if the motor angular velocity changes abruptly, there is a possibility that the switching timing of the conduction pattern may deviate greatly from the appropriate timing corresponding to the actual rotation position of the rotor. Thereby, it is likely that maladjustment occurs. Thus, there is a large effect to stabilize the rotation of the motor in the stable state by adopting the first aspect described above.

(C) In the electronic pump device according to any one of the first aspect, the second aspect and the aspects described in (A) and (B), the oil pump and the main pump driven by the engine are provided in the hydraulic circuit to supply hydraulic operating oil to the hydraulic operating device. Also, the control device causes the oil pump to compensate the oil supply to the hydraulic operating device during the no idle. According to this configuration, the electronic pump device supplies oil pressure during the no idle when the vehicle stops, and the start and stop thereof are repeated. In other words, since the operation state of the electronic pump device (motor) is frequently changed, there is a large effect to improve the responsiveness thereof in the starting state and to stabilize the rotation of the motor in the stable state by adopting the first aspect described above.

DESCRIPTION OF REFERENCE SIGNS

1: Electronic Pump Device
2: Engine
3: Main Pump
4: Transmission Mechanism
5: Hydraulic Circuit
12: Oil Pump
13: Motor
14: EOPECU
18: Superior ECU
21: Driving Circuit
22: Microcomputer
25$u$, 25$v$, 25$w$: Motor Coil
29: Rotor
31: Rotation Position Signal Generation Unit
32: Current Feedback Controlling Unit
33: Motor Control Signal Generation Unit
41: Voltage Divider
42$u$, 42$v$, 42$w$: Comparator
45: Subtracter
46: Feedback Calculation Unit
51: PI Gain Setting Unit
52: Angular Velocity Calculation Unit
53: Memory
I: Actual Current Value
I*: Current Command Value
K: Gain
K1: High Response Gain
K2 Low Response Gain
X, Y: Change Amount
Xth, Yth: Predetermined Rate
ω: Motor Angular Velocity

The invention claimed is:
1. An electric pump device comprising:
an oil pump configured to generate oil pressure;
a motor configured to drive the oil pump; and
a control device configured to control operation of the oil pump by supplying a driving power to the motor, wherein the control device comprises:
- a control signal output unit configured to output a motor control signal;
- a driving circuit configured to output the driving power to the motor based on the motor control signal;
  - a state determination unit configured to determine whether or not the electric pump device is in a stable state where a required oil pressure is supplied to a hydraulic operating device by maintaining a rotation state of the motor; and
  - a gain adjusting unit configured to adjust a gain for a current feedback control so as to reduce a responsiveness of the current feedback control in response to the state determination unit determining that the electric pump device is in the stable state, and
- wherein the control signal output unit is configured to generate the motor control signal by executing the current feedback control so as to cause an actual current value of the driving power being output to the motor to follow a current command value corresponding to a target oil pressure.

2. The electric pump device according to claim 1, wherein the state determination unit determines whether or not the electric pump device is in the stable state based on a parameter indicating a rotation state of the motor.

3. The electric pump device according to claim 1, wherein the gain adjusting unit reduces the gain in the stable state.

4. The electric pump device according to claim 1, wherein the adjusting unit sets the gain equal to a first gain in a starting state and equal to a second gain in the stable state, wherein the second gain is less than the first gain.

5. The electric pump device according to claim 1, wherein the gain adjusting unit sets the gain equal to a first gain from a time at which a starting state begins until the state determination unit determines that the pump device is in the stable state.

6. The electric pump device according to claim 1, wherein the current feedback control is configured to determine a deviation between the current command value and the actual current value of the driving power being output to the motor.

* * * * *